S. R. SKOV & T. SCULLIN.
PASSENGER CAR.
APPLICATION FILED APR. 4, 1908. RENEWED DEC. 27, 1910.

987,329.

Patented Mar. 21, 1911.

2 SHEETS—SHEET 1.

ATTEST
C. M. Fisher.
F. C. Mussun.

INVENTORS
SOREN R. SKOV
TERANCE SCULLIN
By Fisher & Moert
ATTYS.

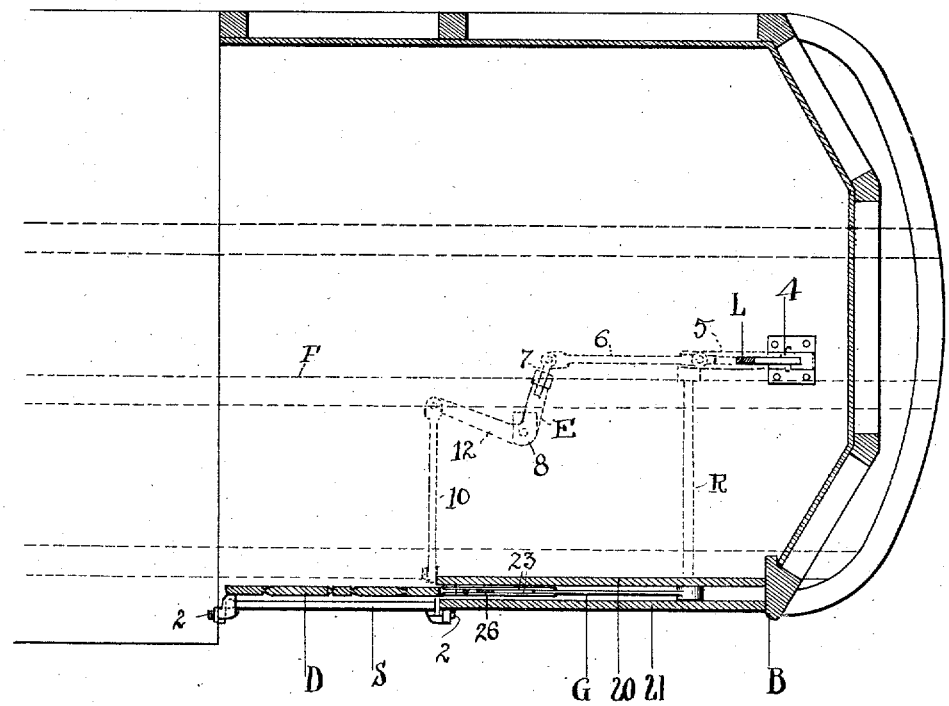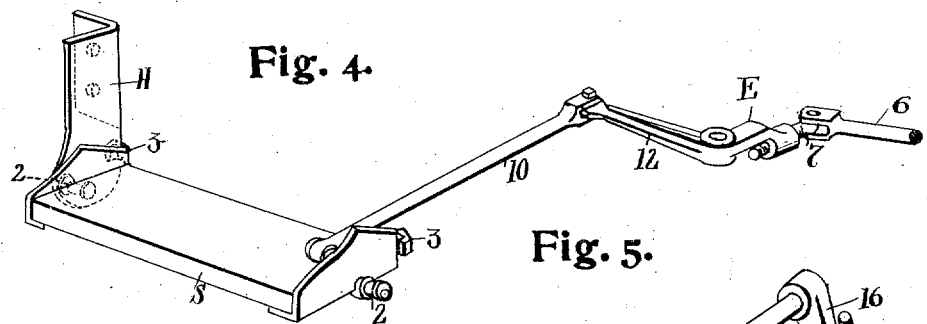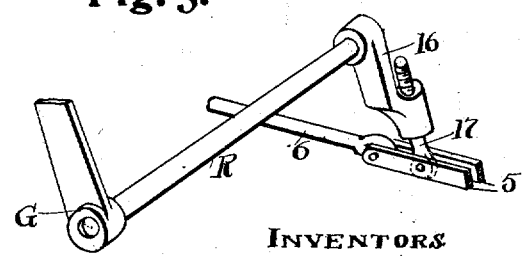

UNITED STATES PATENT OFFICE.

SOREN ROBERTSON SKOV AND TERANCE SCULLIN, OF CLEVELAND, OHIO.

PASSENGER-CAR.

987,329.  Specification of Letters Patent.  Patented Mar. 21, 1911.

Application filed April 4, 1908, Serial No. 425,191.  Renewed December 27, 1910.  Serial No. 599,533.

*To all whom it may concern:*

Be it known that we, SOREN ROBERTSON SKOV and TERANCE SCULLIN, citizens of the United States, residing at Cleveland, in the county of Cuyahoga and State of Ohio, have invented certain new and useful Improvements in Passenger-Cars; and we do declare that the following is a full, clear, and exact description of the invention, which will enable others skilled in the art to which it appertains to make and use the same.

Our invention relates to improvements in passenger cars, and especially in what have become known as pay-as-you-enter cars, and the invention consists particularly in means for controlling the front door and step of such cars, as hereinafter fully described.

Figure 1:
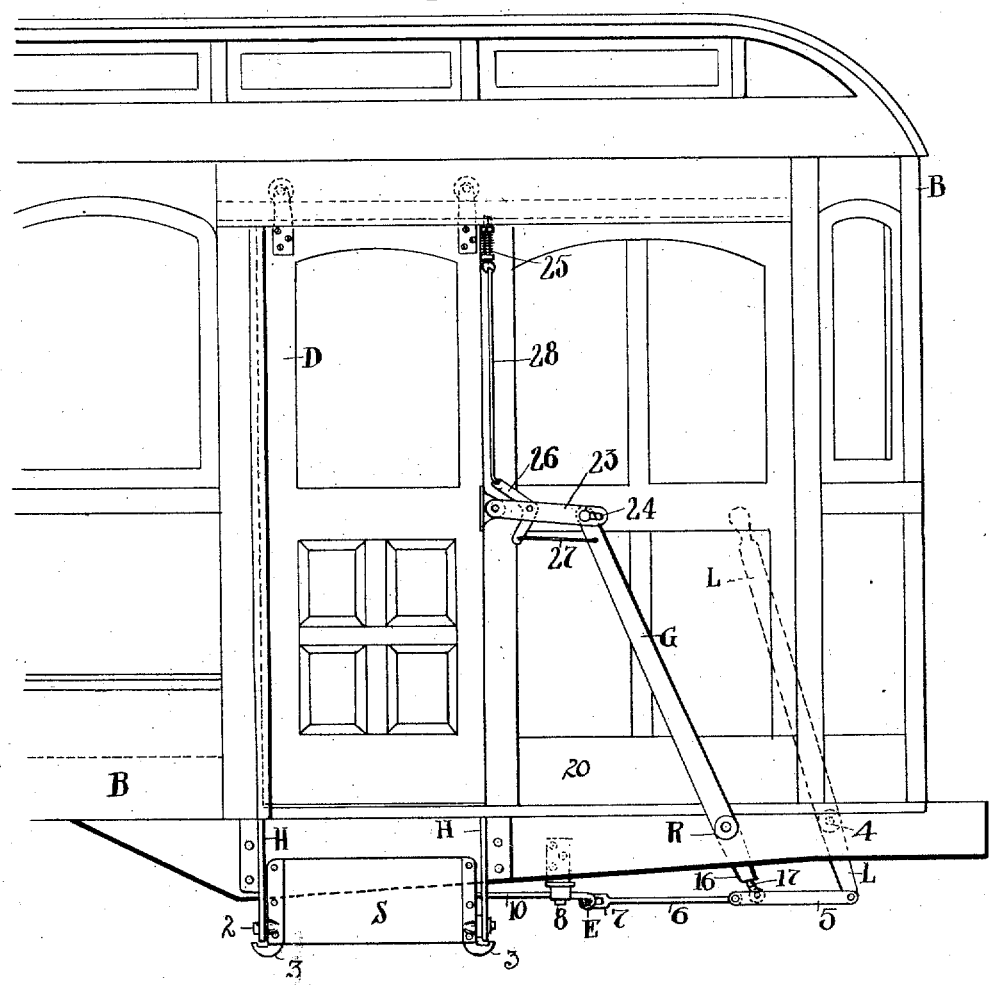
Figure 2:
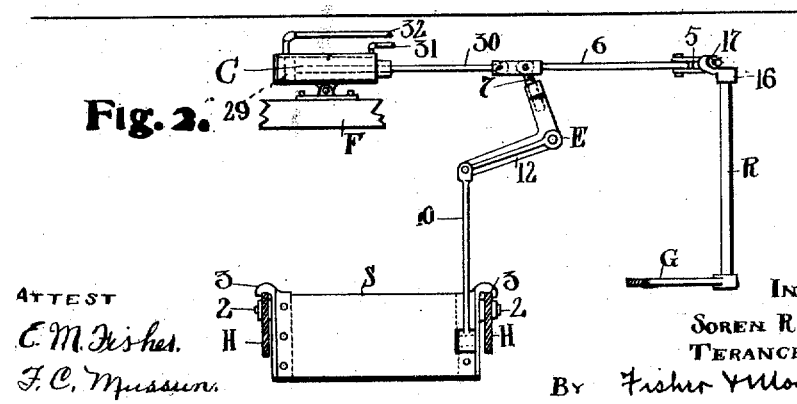

In the accompanying drawings, Figure 1 is a side elevation of the front of a car showing a door and step and our novel controlling mechanism engaged therewith. Fig. 2 is a modification of the controlling mechanism with an air cylinder as the initial actuating member. Fig. 3 is a horizontal section of the car body and plan view of the controlling mechanism showing the step in raised or retired position and the door closed, as also shown in Fig. 1. Fig. 4 is a perspective view of the step and immediate mechanism for controlling same, and Fig. 5 is a perspective view of a further part of said step mechanism, all as will hereinafter fully appear.

The idea of the invention as thus shown is to give the motorman exclusive control of the front exit door of a car and of the step therefrom, so that no one can leave the car by this way until the door is opened and the step simultaneously lowered upon the stopping of the car. This, obviously, may be done in several ways, but the construction shown herein has been found practical and acceptable.

Having reference now to the car, B represents the body thereof, D the front door and S the step therefrom. Suitable hangers H support the step pivotally at the ends thereof on bearings 2, and stops 3, or their equivalent, on the ends of the step engage hangers H to limit the rotation of the step from a vertical, folded or retired position to a horizontal or using position, Fig. 4.

Both the door and the step are preferably operated at the same time or in unison from a single hand actuated lever L, as disclosed in the several views, or by compressed air as in Fig. 2, and said lever is shown as located in the vestibule of the car within convenient reach of the motorman and from which part the passengers, presumably, are excluded. In this instance said lever comes at about the middle and front of the vestibule, and is pivoted in the bottom of the car at 4 as its fulcrum, and extends thence beneath the car a sufficient distance to make operative connections with the other co-acting parts. These comprise, first, a pair of links 5, which are located side by side and pivotally united at opposite sides on the lower extremity of lever L and have the respective door and step controlling mechanisms or lines of operating connections engaged with their other ends. Thus, as to the step, a connecting rod, link or member 6 is engaged with said links 5 at one end and with an adjusting screw 7 at its other end, which forms a rigid extension of one arm of a rocking arm or crank E, which is horizontally pivoted in its angle beneath the car body on a support 8, Fig. 1. Another connecting rod, bar or link 10 engages with the opposite arm 12 of the crank shaped rocker E at one end and with a raised end portion of step S at its other end in such position and relation as will tilt or rotate said step a quarter turn on its bearings 2. It follows, therefore, that the motorman has complete control of the door step by this line of mechanism, whether by lever or compressed air. So, likewise, has the motorman control of the door D, which is designed to be closed when the step is folded and to be open when the step is open or down. To these ends we provide a sub-line of mechanism proceeding initially from links 5 and comprising a rock shaft or rod R, rotatably supported in or beneath the car body in suitable bearings therein and having a controlling arm 16 rigid with its inner end and carrying an adjusting screw 17, which is pivotally connected with said links 5. At the opposite end said rod or shaft R has a lever G rigidly fixed thereon and arranged to stand more or less vertically between inner and outer panels 20 and 21 of the side of the car, and to swing between said panels on its pivot, which is rod R.

The door D is adapted to slide rather than being hinged, or, to be exact, it is adapted to run back and forth on rollers and a track at its top between said panels 20 and 21. A pair of links 23 connects the upper end of lever G with about the middle of the door at its top, and said link has a slot 24 in its end engaged by a pin or the like through the end of lever G and adapted to afford such measure of free play to said lever in said slot before the door is reversed as may be necessary to release the spring pressed bolt 25 which locks the door shut. Said bolt is controlled by a bell crank 26 on links 23, and which has one arm connected by flexible wire 27, or the like, with lever G, and the other arm connected by wire 28 with bolt 25. Close operating connection is thus made between lever G and said bolt, and the bolt is withdrawn before the pull comes upon the door through link 23, slot 24 making the necessary accommodation, and the door is closed before the bolt is locked.

In Fig. 2 we show a modification of the initial portion of the invention in that compressed air or the like is employed instead of hand energy through lever L as in the other views. So in this case we employ a cylinder C, which is supported on a beam or bar F on the bottom of the car and has a piston 29 and piston rod 30, which connects with the extremity of rod 6, or makes an equivalent connection with that of lever E or the adjusting screw 7. Pressure is applied on opposite sides of said piston 29 through pipes 31 and 32. The screws 7 and 17 respectively in the operating lines of step S and door D serve to restore said parts to correct working position when they get out of harmony for any reason.

The door and the step are operatively united so as to be simultaneously controlled, but the operation might be as to either alone. That is, the door might be controlled independently of the step, and vice versa. By having the step foldable we prevent persons standing thereon and stealing rides.

What we claim is:—

1. A car having a platform and a door and a step at its side on a plane beneath and outside the platform and door and provided with pivot supports at its ends on which the step is adapted to turn to a vertical position, and means to open and close said door and step simultaneously comprising an operating lever arranged above said platform and mechanism mounted beneath said platform engaged therewith and with said door and step.

2. A car having a vestibule platform at one end and a side door thereto and a step beneath and outside the door rotatably mounted at its ends, in combination with a vertical lever in the vestibule having its lower end projecting beneath the platform and separate lines of operating connections therefrom supported upon the bottom of said platform and leading to both said door and step.

3. The car having a sliding door and a pivoted step, a lever in the car, a direct line of mechanism therefrom to rotate said step, a rotatable rod connected with said mechanism, and means connected with said rod to slide said door.

4. A car, a sliding door at the side thereof, and a pivoted step therefor, in combination with a lever in the front of the car, two lines of mechanism operatively connected therewith and with said door and step respectively, and the line to the door comprising a rocking shaft and a lever operatively connected with the door.

5. A car having a door and a movable step for the door, a lock for the door, and mechanism to jointly operate the door and step and said lock.

6. A car having a door and a movable door step adapted to be actuated in unison, a lock for the door, and a single controlling member having mechanism to operate said lock and door and step.

In testimony whereof we sign this specification in the presence of two witnesses.

SOREN ROBERTSON SKOV.
TERANCE SCULLIN.

Witnesses:
R. B. MOSER,
F. C. MUSSUN.

---

Copies of this patent may be obtained for five cents each, by addressing the "Commissioner of Patents, Washington, D. C."